United States Patent Office 3,796,670
Patented Mar. 12, 1974

3,796,670
METHOD OF REGENERATING AN AGED RANEY NICKEL CATALYST WITH CARBOXYLIC ACID AND BASE TREATMENT
William Johan Meindert Pieters, Denville, N.J., John Freel, Oakmont, Pa., and Robert Bernard Anderson, Ancaster, Ontario, Canada, assignors to W. R. Grace & Co., New York, N.Y.
No Drawing. Filed Oct. 21, 1970, Ser. No. 82,832
Int. Cl. B01j *11/02, 11/30*
U.S. Cl. 252—413
7 Claims

ABSTRACT OF THE DISCLOSURE

Raney nickel catalysts which have aged from storage are regenerated by successive treatment in an aqueous organic acid solution and in an aqueous base solution. Then the catalyst is separated and washed. The regenerated catalyst has a higher activity than the freshly prepared catalyst.

BACKGROUND OF THE INVENTION

This invention relates to a process for regenerating an aged Raney nickel catalyst containing Al and Ni, so as to produce a catalyst having a vastly improved activity. Raney nickel catalysts gradually lose activity on prolonged storage.

The prior art includes U.S. Pats. 3,139,408; 2,983,734 and 3,425,959.

U.S. Pat. 3,139,408 involves a process for preparing a Raney nickel catalyst which includes: (a) digesting a Raney nickel-aluminum alloy in alkali, (b) washing the digested product free from alkali with water, (c) treating the digested and washed product of step (b) in suspension first with a reagent that is a proton acceptor and subsequently with a reagent that is a proton donor, and (d) washing the treated product of step (c) free from the treating reagents with water.

Other related patents include: U.S. Pat. No. 3,418,258, which treats the catalyst with a solution containing a weak acid (acetic), a salt of a weakly basic metal and an oxidizing anion; U.S. Pat. No. 2,983,734, which teaches treatment with phosphoric or sulphuric acid; and U.S. Pat. No. 3,425,959 which incorporates the use of an oxidizing agent.

SUMMARY OF THE INVENTION

This invention involves a process for regenerating the activity of a porous, finely-divided catalyst for use in, for example, hydrogenation processes where the catalyst has been aged by storage in an aqueous solution. The catalyst has been prepared by initially making an alloy consisting essentially of nickel and aluminum, physically reducing the alloy to a finely-divided state, and chemically partially dissolving the aluminum from the alloy to form a porous finely-divided catalyst which comprises at least 2 weight percent aluminum, and the remainder being a major part activated nickel and a minor part chemically-bonded oxygen.

The process of this invention for regenerating the aged catalyst involves admixing the aged catalyst with an aqueous solution containing an organic acid. The pH of the admixture is raised to between about 6.5 and about 7.1 by adding a base. Prefereably, before the base is added, the temperature of the admixture is rapidly raised to at least 40° C. and maintained at that temperature level for at least 5 minutes. The pH of the admixture is then further raised between about 7.2 and about 8.0 by adding a base. Preferably, the temperature of the admixture is lowered to below room temperature before the pH is raised to at least between about 7.2 and 8.0. The liquid portion of the admixture is removed to leave the catalyst portion and the catalyst portion is washed to produce a regenerated, porous, finely-divided catalyst.

Apparently, oxidation of surface nickel atoms on the catalyst during storage, either by the storage liquid or dissolved air, was responsible for deactivation. Stripping off this oxide layer by dissolution in an aqueous solution of organic acid followed by neutralization with aqueous alkali was found to be effective. The foregoing is one possible theoretical explanation of this invention, but this invention is not dependent upon the theoretical explanation. Minor amounts of nickel are removed in the regeneration process.

The neutralization step is an important part of this disclosure, as the literature indicates that acids generally severly poison the catalyst. Washing with water was found to remove all the acid, but regenerated catalysts of low activity are obtained. The hypothesis regarding removal of surface layers of nickel oxide is not essentially to this invention, as the experimental results show that the acid treatment plus neutralization (whatever the proposed mechanism) increases the activity of the catalyst.

The regenerated catalysts of this invention have activities of two or more times the activity of freshly prepared Raney nickel catalysts.

The catalysts of this invention may be employed in the hydrogenation of carbonyl-containing organic compounds to the corresponding hydroxy-containing compounds. They may also be employed in the hydrogenation of compounds containing aromatic unsaturation to form cycloaliphatic compounds, nitro groups to amino groups, or olefinic compounds to saturated compounds. The catalysts also may be advantageously employed in certain dehydrogenation, dehalogenation and desulfurization reactions.

DETAILED DESCRIPTION OF THE INVENTION

The Raney nickel catalyst can be prepared by any method known to the art. The alloy from which the catalyst is prepared can contain from 30 to 60 weight percent nickel and from 40 to 70 weight percent aluminum. The examples give one method of preparing the catalyst. The fresh catalyst contains from 80 to 96 weight percent nickel, from 2 to 12 weight percent aluminum, and the remainder is essentially chemically-bonded oxygen.

The regeneration of the Raney nickel catalyst can be achieved by the use of any of a number of organic acids. The organic acid must not have a high reactivity with the Raney material. The preferred organic acid is lactic acid.

Organic acids which can be used to regenerate the Raney nickel catalyst include: saturated monocarboxylic aliphatic acids, e.g., formic acid, acetic acid, propionic acid, butyric acid, isobutyric acid, valeric acid, isovaleric acid, caproic acid, enanthic acid, caprylic acid, etc., saturated dicarboxylic aliphatic acids, e.g., oxalic acid, malonic acid, succinic acid, glutaric acid, adipic acid, pimelic acid, etc.; saturated tricarboxylic aliphatic acids, e.g., tricarballylic acid, etc.; hydroxy-substituted aliphatic acids, e.g., glycolic acid, lactic acid, β-hydroxybutyric acid, gluconic acid, tartronic acid, malic acid, tartaric acid, saccharic acid, citric acid, etc.; alicyclic acids, e.g., cyclopentanecarboxylic acid, hexahydrobenzoic acid, hexahydrophthalic acid, etc. The useful organic acids must be at least partially soluble in water.

After the aged catalyst and the aqueous organic acid solution are admixed, the admixture is preferably stirred, heated rapidly to at least 40° C. and held at that temperature for at least 5 minutes. The pH of the solution is then increased to between about 6.5 and about 7.1 by the addition of a base. The base is preferably in an aqueous solution and the addition is preferably done by means such as titration. The temperature can be maintained at the elevated level during the addition of the base.

A variety of bases can be used to adjust the organic-treated catalyst containing solution to a pH of between about 6.5 and about 7.1. The preferred base is sodium hydroxide, but examples of suitable bases are potassium hydroxide, sodium carbonate, tetramethyl-ammonium hydroxide, etc. (Any of the above bases can also be used to form the catalyst by partially leaching out the aluminum.)

Any base mentioned above can be used to raise the pH from between 6.5 and about 7.1 to a value of about 7.2 to about 8 or above (up to as high as about 10). The preferred base is sodium hydroxide, and it is preferably in an aqueous solution. Before the base is added, the temperature of the admixture is lowered to a level below room temperature, say, just about 0° C.

The washing step can be achieved in two steps by first washing the catalyst with water and then with absolute ethanol (or any other dry alcohol). The washing step is preferably achieved in one step by washing the catalyst with any dry alcohol. Useful dry alcohols include the alkanols, e.g., the primary saturated aliphatic alcohols such as methanol, ethanol, propanol, 1-butanol, amyl alcohol, hexyl alcohol, heptyl alcohol, octyl alcohol, nonyl alcohol, decyl alcohol, dodecyl alcohol, tetra-decyl alcohol, cetyl alcohol, octadecyl alcohol, isobutyl alcohol, 1-undecanol, 1-tridecanol, 1-pentadecanol, 1-heptadecanol, 1-nonadecanol, 1-duodecanol, 8-hexadecenyl-1-ol, etc., the secondary saturated aliphatic alcohols such as sec-butyl alcohol, 2-octanol, etc., and the tertiary saturated aliphatic alcohols such as t-butyl alcohol, etc.; the aromatic alcohols such as benzyl alcohol, etc.; the alicyclic alcohols such as cyclohexanol, etc., and the heterocyclic alcohols such as furfuryl alcohol, etc.

The activities in this application were determined for the hydrogenation of cyclohexene in ethanol at 30° C. with the hydrogen pressure maintained at atmospheric pressure in a stirred microreactor. The reactor contained 5 cc. ethanol and about 40 mg. catalyst, and 0.1 cc. of cyclohexene was used. The hydrogenation was followed by measuring the uptake of hydrogen. Activities are based on the slope of the hydrogen consumption time curve at a conversion of 50 weight percent of the cyclohexene, divided by the weight of catalyst, but are reported here on a relative basis.

As used herein, the term room temperature is defined as a temperature between 60° F. and 80° F.

Weight percent or percent by weight as used throughout this application, unless otherwise specifically stated, is defined conventionally as grams per hundred grams of total composition (dry basis).

The following examples illustrate this invention. All percentages and parts therein are by weight, unless otherwise stated.

Example 1

A nickel-aluminum alloy was prepared by adding 200 gm. of aluminum shot and 200 gm. of nickel shot to a graphite crucible. The optimum aluminum and nickel shot diameter was about ¼"; shot less than ¼" was difficult to stir, and shot greater than ¼" resulted in a very large exotherm. The crucible was placed in a furnace at about 1100° C. Cooling caused by the crucible, as well as heat loss caused by opening the furnace door, lowered the temperature to about 1000° C. The crucible was removed from the furnace after about 15 minutes, at which time the furnace temperature was 1075° C. to 1100° C. Immediately after removal from the furnace, the crucible contents were stirred with a carbon rod; no attempt was made to preheat the rod before stirring. After vigorous stirring for 30 seconds, the contents gradually turned red, and then metal solution took place, resulting in a white hot melt. The melt was stirred for an additional 15 seconds. The molten alloy was cooled by pouring it into a depression in refractory grade sand. The resultant alloy contained about 50 weight percent Al and about 50 weight percent Ni.

The nickel-aluminum alloy was easily crushed to jagged, irregularly shaped pieces about ¼" x ¼" in a jaw crusher. The pieces are reduced to a fine powder (−200 mesh U.S. Sieve Series), using a ball mill with ½" steel balls. The catalyst was prepared and activated by adding the −200 mesh alloy powder to a 1 liter resin kettle flask along with 100 ml. of tap water. Then 100 ml. of 40 percent NaOH solution was slowly added. After the addition of the first 10 ml. of NaOH, hydrogen evolved vigorously and the solution temperature rose rapidly to 90°–100° C. The first 50 ml. were added in five 10 ml. increments over a period of 5 minutes, after which the remaining 50 ml. were added rapidly. A magnetic stirrer was used to keep the flask contents agitated. The total $H_2$ evolved was measured using a wet test meter. The flask was heated to maintain the contents using a wet test meter. The flask was heated to maintain the contents at a reflux temperature of about 107° C. The leaching (activation) time was 2 hours. After leaching (activation), the catalyst contained 90 weight percent Ni, 3.1 weight percent Al, and the balance being oxygen.

Example 2

Freshly prepared Raney nickel catalyst was tested using the activity test given above, and the activity was assigned an arbitrary value of 100. The Raney nickel catalyst contained 80 percent nickel and 10 percent aluminum, and was prepared from an alloy containing 50 percent nickel and 50 percent aluminum. The freshly prepared Raney nickel catalyst was stored in water for 90 days.

1 gm. of the aged Raney nickel catalyst was added to a solution of 1 gm. of lactic acid in 50 cc. of distilled water. The mixture was stirred, heated rapidly to 50° C., and held at that temperature for 10 minutes. The mixture was titrated with 0.05 N aqueous NaOH solution to approximately a pH of 7; ice was added to cool the solution rapidly to about 0° C., and the pH was adjusted to about 7.5 by addition of a dilute aqueous NaOH solution using a pH meter. The liquid was poured off the catalyst. The catalyst washed with 500 cc. of water, and then with 500 cc. of absolute ethanol. A portion of the catalyst was used in the activity test. An activity of 250 was obtained for the regenerated Raney nickel catalyst.

Example 3

Example 2 was repeated, except that the lactic acid was replaced with an equal normal solution of citric acid. The activity of the regenerated Raney nickel catalyst was 240.

Example 4

Example 2 was repeated, except that the lactic acid was replaced with an equal normal solution of formic acid. The activity of the regenerated Raney nickel catalyst was 200.

Example 5

Example 2 was repeated, except that the lactic acid was replaced with an equal normal solution of acetic acid. The activity of the regenerated Raney nickel catalyst was 210.

Example 6

Example 2 was repeated, except that the lactic acid was replaced with an equal normal solution of tartaric acid. The activity of the regenerated Raney nickel catalyst was 240.

Example 7

Examples 1 and 2 were repeated, except that the Raney nickel catalyst contained 85 percent nickel and 8 percent aluminum, and was prepared from an alloy containing 58 percent nickel and 42 percent aluminum. The activity of the fresh Raney nickel catalyst was 240. The activity of the regenerated Raney nickel catalyst was 240.

Example 8

Examples 1 and 2 were repeated, except that the Raney nickel catalyst contained 88 percent nickel and 5 percent aluminum, and was prepared from an alloy containing 43 percent nickel and 57 percent aluminum. The activity of the fresh Raney nickel catalyst was 240. The activity of the regenerated Raney nickel catalyst was 240.

Example 9

Example 2 was repeated, except that the NaOH used to adjust the pH to about 7 after the organic acid treatment was replaced with potassium hydroxide, and the NaOH used to then adjust the pH to about 7.5 was replaced with potassium hydroxide. The activity of the regenerated Raney nickel catalyst was 240.

Example 10

Example 2 was repeated, except that the lactic acid was replaced with an equal normal solution of oxalic acid. The activity of the regenerated Raney nickel catalyst was 220.

Example 11

Example 2 was repeated, except that the NaOH used to adjust the pH to about 7 after the organic acid treatment was replaced with sodium carbonate and the NaOH used to then adjust the pH to about 7.5 was replaced with sodium carbonate. The activity of the regenerated Raney nickel catalyst was 240.

Example 12

Example 2 was repeated, except that the lactic acid was replaced with an equal normal solution of adipic acid. The activity of the regenerated Raney nickel catalyst was 200.

Example 13

Example 2 was repeated, except that the catalyst was washed with only 1000 cc. of ethanol instead of first water and then ethanol. The activity of the regenerated Raney nickel catalyst was 250.

Example 14

Example 2 was repeated, except that the catalyst was washed with only 1000 cc. of methanol instead of first water and then ethanol. The activity of the regenerated Raney nickel catalyst was 240.

Example 15

Example 2 was repeated, except that the catalyst was washed with only 1000 cc. of isobutyl alcohol instead of first water and then ethanol. The activity of the regenerated Raney nickel catalyst was 240.

What is claimed is:

1. A process for regenerating the activity of a storage-aged porous, finely-divided catalyst, said catalyst having been prepared by preparing an alloy consisting essentially of nickel and aluminum, physically reducing said alloy to a finely divided state, and chemically partially dissolving said aluminum from said alloy to form an active porous finely-divided catalyst which comprises:

(a) admixing said aged catalyst with an aqueous solution containing carboxylic acid selected from the group consisting of monocarboxylic aliphatic acids, dicarboxylic aliphatic acids, tricarboxylic aliphatic acids and hydroxy-substituted aliphatic acids, and maintaining the temperature of said admixture at at least 40° C. for at least 5 minutes, whereby oxide layers on said aged catalyst are dissolved;

(b) sequentially first raising the pH of this admixture to between about 6.5 and about 7.1, cooling the admixture to below room temperature to about 0° C., and then further raising the pH of the admixture to between about 7.2 and about 8.0 wherein an aqueous alkali base effective to neutralize the organic carboxylic acid component of the admixture is used in sequentially raising the pH;

(c) removing the liquid portion of the admixture to leave a catalyst portion; and (d) washing said catalyst portion "with dried alcohol or sequentially with water and then with dried alcohol to produce a regenerated, porous, finely-divided catalyst.

2. A process as described in claim 1 wherein said acid of step (a) is lactic acid.

3. A process as described in claim 1 wherein said acid of step (a) is acetic acid.

4. A process as described in claim 1 wherein said base added in step (b) is sodium hydroxide and said base is added in the form of an aqueous solution.

5. A process as described in claim 1 wherein said washing step (e) comprises washing said separated catalyst portion with water and then with absolute ethanol.

6. A process as described in claim 1 wherein said washing step (e) comprises washing said separated catalyst portion with a dried alcohol.

7. A process as described in claim 6 wherein said dried alcohol is absolute ethanol.

References Cited

UNITED STATES PATENTS

| | | | |
|---|---|---|---|
| 3,489,694 | 1/1970 | Weidlich et al. | 252—477 Q |
| 1,431,982 | 10/1922 | Richter et al. | 252—413 |
| 2,950,260 | 8/1960 | Rosenbaum et al. | 252—477 Q |
| 3,454,364 | 7/1969 | Sturm et al. | 252—466 J |
| 3,165,478 | 1/1965 | Hauschild et al. | 252—413 |
| 2,289,784 | 7/1942 | Houghton | 252—413 |
| 2,326,275 | 8/1943 | Zeltner | 252—477 Q |
| 3,203,905 | 8/1965 | Akabori et al. | 252—430 |
| 3,676,364 | 7/1972 | Coates | 252—413 |

DANIEL E. WYMAN, Primary Examiner

P. E. KONOPKA, Assistant Examiner

U.S. Cl. X.R.

252—414, 477 Q; 260—666 P